US008522288B2

(12) United States Patent
Ikeda et al.

(10) Patent No.: US 8,522,288 B2
(45) Date of Patent: Aug. 27, 2013

(54) IP BROADCASTING SYSTEM AND A MULTICAST GROUP MANAGEMENT APPARATUS FOR THE SAME

(75) Inventors: Hiroki Ikeda, Hachioji (JP); Kenichi Sakamoto, Kokubunji (JP); Taishi Shinagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1234 days.

(21) Appl. No.: 11/778,969

(22) Filed: Jul. 17, 2007

(65) Prior Publication Data
US 2008/0155612 A1 Jun. 26, 2008

(30) Foreign Application Priority Data

Dec. 20, 2006 (JP) ................................. 2006-343320

(51) Int. Cl.
*H04N 7/173* (2011.01)
(52) U.S. Cl.
USPC ............................................ 725/86; 725/105
(58) Field of Classification Search
USPC .................................................. 725/114–117
See application file for complete search history.

(56) References Cited

U.S. PATENT DOCUMENTS

| 2003/0106065 | A1* | 6/2003 | Sakai et al. | .......... 725/91 |
| 2006/0037037 | A1 | 2/2006 | Miranz | |
| 2006/0126597 | A1 | 6/2006 | Chae et al. | |
| 2006/0126668 | A1* | 6/2006 | Kwon et al. | .......... 370/486 |
| 2006/0159117 | A1* | 7/2006 | Furlong et al. | .......... 370/432 |
| 2006/0182052 | A1 | 8/2006 | Yoon et al. | |
| 2007/0074281 | A1* | 3/2007 | Ikeda | .......... 726/13 |

FOREIGN PATENT DOCUMENTS

| JP | 2003-143587 | 5/2003 |
| JP | 2006-174453 | 6/2006 |
| JP | 2006-229971 A | 8/2006 |
| WO | WO 2004086245 A1 * | 10/2004 |

OTHER PUBLICATIONS

IPTV: Where Standardization is Getting Started, No. 933, pp. 153-158, Nikkei Electronics, Aug. 28, 2006.

* cited by examiner

*Primary Examiner* — Vivek Srivastava
*Assistant Examiner* — Rong Le
(74) *Attorney, Agent, or Firm* — Mattingly & Malur, PC

(57) ABSTRACT

The present invention provides an IP broadcasting system that can receive IP broadcasting videos over an IP multicast network. In the IP broadcasting system, a multicast group management apparatus for IP broadcasting that holds multicast group identifiers is connected via an IP multicast network over which IP broadcasting services are provided. When a user issues a request to switch an IP broadcasting channel from an IP broadcasting terminal, a query message including the requested IP broadcasting channel identifier is transmitted to a management apparatus. The IP broadcasting terminal receives a response message indicating the correspondence between the IP broadcasting channel identifier and a multicast group identifier, and transmits a video reception request message to a multicast group by using the received multicast group identifier.

9 Claims, 20 Drawing Sheets

| IP BROADCASTING CHANNEL IDENTIFIER | STATUS |
|---|---|
| Ch1@ISP-A.COM | ON AIR |
| Ch2@ISP-A.COM | ON AIR |
| Ch3@ISP-A.COM | NOT BROADCASTED |
| ... | |
| Ch1@ISP-B.COM | ON AIR |
| Ch2@ISP-B.COM | ON AIR |
| Ch3@ISP-B.COM | NOT BROADCASTED |
| ... | |
| | |

13a — IP BROADCASTING CHANNEL IDENTIFIER
13b — STATUS

FIG.8

| MULTICAST ADDRESS | ALLOCATION STATUS |
|---|---|
| 2240. 0. 0 | ALLOCATABLE |
| ... | |
| 239. 255. 255. 10 | ALLOCATED |
| 239. 255. 255. 11 | ALLOCATED |
| ... | |
| 239. 255. 255. 20 | ALLOCATABLE |
| 239. 255. 255. 21 | ALLOCATABLE |
| ... | |
| 239. 255. 255. 255 | ALLOCATABLE |

FIG.13

| MULTICAST ADDRESS | AREA | ALLOCATION STATUS |
|---|---|---|
| 2240. 0. 0 | AREA A | NOT ALLOCATED |
| ... | | |
| 239. 255. 255. 10 | AREA B | ALLOCATED |
| 239. 255. 255. 11 | AREA B | ALLOCATED |
| ... | | |
| 239. 255. 255. 20 | AREA C | NOT ALLOCATED |
| 239. 255. 255. 21 | AREA D | NOT ALLOCATED |
| ... | | |
| 239. 255. 255. 255 | AREA D | NOT ALLOCATED |

IP BROADCASTING SYSTEM AND A MULTICAST GROUP MANAGEMENT APPARATUS FOR THE SAME

CLAIM OF PRIORITY

The present application claims priority from Japanese application JP 2006-343320 filed on Dec. 20, 2006, the content of which is hereby incorporated by references into this application.

BACKGROUND OF THE INVENTION

The present invention relates to broadcasting services by use of Internet Protocol (IP), and IP broadcasting system technology for performing combined services of broadcasting and telecommunications by use of multicast technology.

Multicast communication is technology for transmitting IP datagrams to members belonging to a multicast group while copying it by a multicast router, and is already developed in a wide range of applications. So-called multicast technology complies with standard documents RFC (Request for Comments) 1112, 2236, and 3376 that are produced by the IETF (Internet Engineering Task Force) and publicized by the IAB (Internet Architecture Board), and is a technology for managing and reporting information about members within a group that perform multicast communications. This technology is called IGMP (Internet Group Management Protocol) in the above-described RFC, and is applied to multicast routers. The multicast communications are performed by multicast routers to which the technology is applied. Also, MLD (Multicast Listener Discovery) complying with RFC 2710, 3810 is used. This is applied to multicast communications compliant with IPv6.

Multicast communications are characterized in that only one multicast IP datagram may be transmitted during transmission. Specifically, multicast IP datagrams are automatically copied by multicast routers to which IGMP has been applied, and transmitted to a network to which members of a multicast group belong. A multicast IP datagram is identified by one address value called a multicast address.

Recently, in the IPTV (Internet Protocol TV) broadcasting services, the multicast technology is applied. In the broadcasting services, multicast addresses are allocated to IPTV broadcasting channels for distribution to a multicast group over a network composed of multicast routers. On the other hand, IP broadcasting terminals, which are viewers of the IPTV broadcasting channels, when wanting to receive IPTV broadcasting, can receive the IPTV broadcasting by joining the multicast group to become members of the multicast group. The IP broadcasting terminals must previously know IP information such as multicast address information. Management and notification of such information about multicast members are performed by IGMP and MLD.

These multicast technologies are used for services needing reduced data amounts on a network when a large number of users receive the same data like IPTV broadcasting services. They are also used for IP packet distribution that need a reduced load relating to setting individual transmission destination IP addresses in services that suffer variations in the number of receiving users.

In actual IPTV broadcasting services, however, IP broadcasting users select IPTV broadcasting channels to be viewed from IPTV broadcasting channel names and channel numbers offered by broadcasters. Accordingly, the IP broadcasting terminals must locate a multicast address from the channel numbers to acquire IP broadcasting data from the network.

However, when the number of IP broadcast programs offered, the number of IP broadcasting channels, and the number of IP broadcasting terminals themselves due to an increase in the number of users increase, the IP broadcasting system has great difficulties in managing and acquiring all multicast addresses on the network.

On the other hand, in Japanese Patent Application Laid-Open Publication No. 2006-174453, a method is disclosed which, when providing broadcasting digital services, generates correction EPG (Electronic Program Guide) information including IP information specific to broadcasting channels for EPG information including information about contents and kinds of programs, and multiplexes it into broadcasting streams for transmission to user terminals.

SUMMARY OF THE INVENTION

Since conventional IP broadcasting servers do not have a function with which to report information about TV broadcasting channels and information about multicast addresses to users, they cannot efficiently report multicast information for new addition of IP broadcasting terminals. When EPG information is used, since it is added to broadcasting streams, only when the broadcasting streams have been received, the EPG information of the program can be received. Therefore, by the mere addition of new broadcasting programs by broadcasters, users cannot know EPG information of the programs and IP information included in it.

An object of the present invention is to provide an IP broadcasting system that eliminates the need to set IP broadcasting channel information and multicast addresses by broadcasters, and reduces the load of reporting multicast addresses to IP broadcasting terminals, and a multicast group management apparatus for the IP broadcasting.

To achieve the above-described object, the present invention provides an IP broadcasting system that provides IP broadcasting services over an IP multicast network, wherein the IP broadcasting system includes: IP broadcasting servers that can distribute video data by adding multicast group identifiers; IP broadcasting terminals that can transmit IP broadcasting channel identifiers; and a multicast group management apparatus for IP broadcasting including a storing unit that holds correspondence information between the multicast group identifiers and the IP broadcasting channel identifiers. The IP broadcasting terminals include a transmitting/receiving unit that transmits a query message including the requested IP broadcasting channel identifier to the multicast group management apparatus for IP broadcasting, receives a response message including the multicast group identifier corresponding to the IP broadcasting channel identifier included in the query message that is transmitted from the multicast group management apparatus for IP broadcasting, and transmits a video reception request message by using the received multicast group identifier.

Furthermore, in the present invention, a set-top box is provided which connects the IP broadcasting terminals to the IP multicast network to which the IP broadcasting servers that can distribute video data by adding multicast group identifiers are connected. The set-top box includes: a transmitting unit that previously transmits a video distribution request message, based on user information from the connected IP broadcasting terminals; a receiving unit that receives video data transmitted based on the video distribution request message; and a processing unit that, when receiving a video reception request message from the IF broadcasting terminals, transmits the video data corresponding to the video reception request message to the IP broadcasting terminals.

As a multicast group identifier, preferably, a multicast address or a combination of a multicast address and a source address is used. The multicast address and source address which serve as a multicast group identifier are those that are defined in the above-described IGMP and MLD.

According to the present invention, in an IP broadcasting system that provides IP broadcasting services over an IP network, by linking a multicast group management apparatus for IP broadcasting and IP broadcasting terminals, IP broadcasting channel numbers and multicast addresses can be efficiently managed.

Even if the number of IPTV broadcasting channels increases, IP broadcasting terminals can acquire only multicast addresses for necessary IP broadcasting channel numbers. As a result, loads caused by a change in the number of IPTV broadcasting channels are reduced.

Furthermore, even if the number of IP broadcasting terminals increases, since multicast addresses can be acquired without accessing all IP broadcasting servers, loads caused by a change in the number of IP broadcasting terminals are reduced.

Furthermore, by linking IP broadcasting terminals and a multicast group management apparatus for IP broadcasting, the load on broadcasters to set multicast addresses in IP broadcasting terminals is reduced.

Furthermore, preferably, by allowing the set-top boxes to previously receive video data, the time required to change channels of IP broadcasting is shortened. As a result, comfortable service provision to users becomes possible.

BRIEF DESCRIPTION OF THE DRAWINGS

These and other features, objects and advantages of the present invention will become more apparent from the following description when taken in conjunction with the accompanying drawings wherein:

FIG. 8 is a drawing showing an example of the structure of a multicast address pool table of a first embodiment;

FIG. 13 is a drawing showing an example of the structure of a multicast address pool table of a first embodiment;

DETAILED DESCRIPTION OF THE INVENTION

Hereinafter, an embodiment of the present invention will be described as an example of using IPTV broadcasting as an application. However, it goes without saying that the present invention is not limited to this application. Although use of multicast addresses as multicast group identifiers is exemplified, the present invention is not limited to this.

Figure 1:
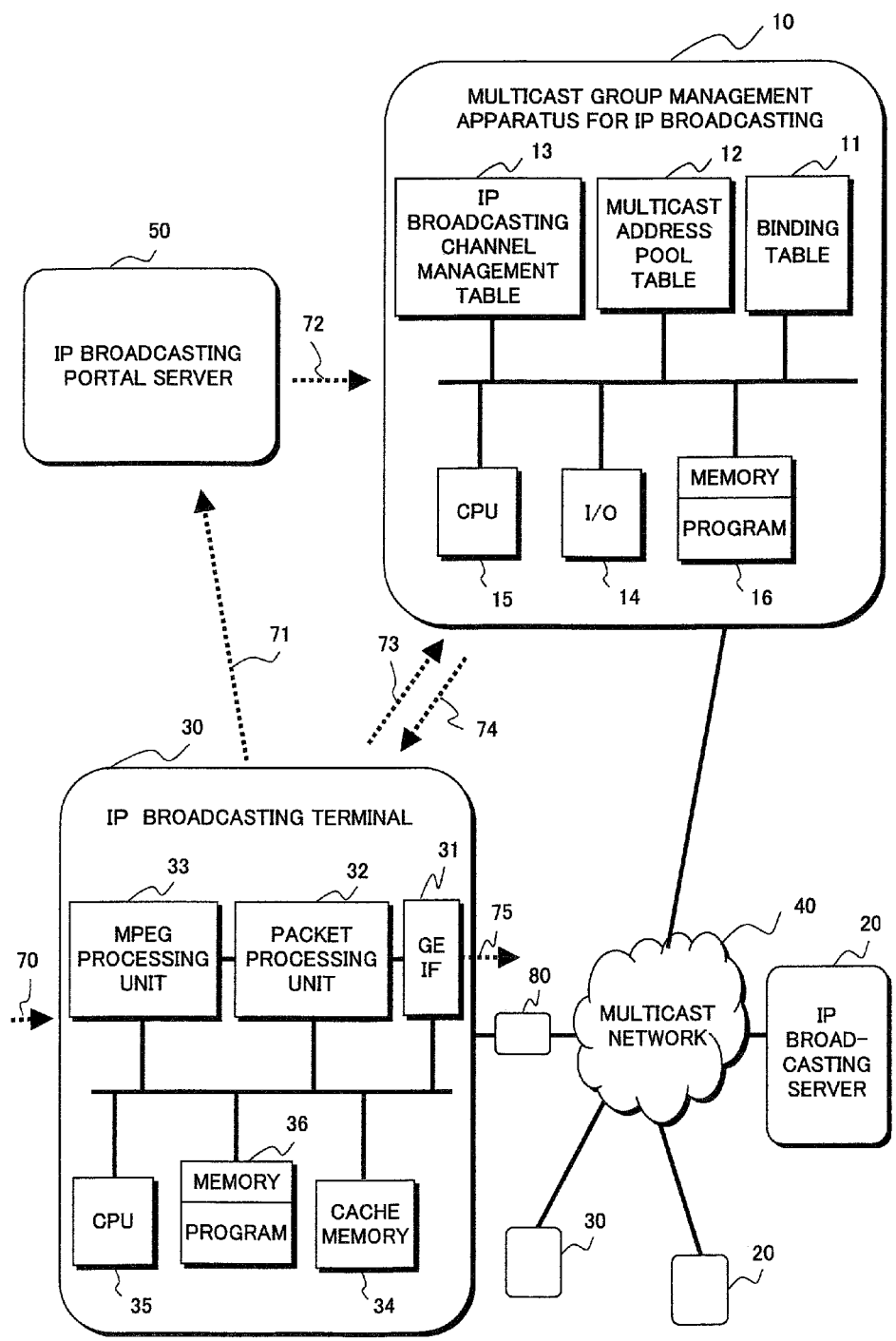
FIG. 1 is a drawing for explaining an IP broadcasting communication system, a multicast address management apparatus for IP broadcasting, and an IP broadcasting terminal to which an IP broadcasting management method of a first embodiment of the present invention is applied.

FIG. 1 is a drawing showing a first embodiment of an IP broadcasting system for providing IP broadcasting services of the present invention.

First, a network configuration is described. The IP broadcasting services are performed between an IP broadcasting server 20 and an IP broadcasting terminal 30 over a multicast network 40. The multicast network 40 includes a multicast router (not shown) that can multicast an IP packet having a multicast address as a multicast group identifier, wherein the IP packet is transmitted based on the multicast address. Two or more IP broadcasting terminals 30 may exist. A set-top box 80, which is usually installed in a house, has a media conversion function and the like. For example, in the case of an optical access network, an ONU (Optical Network Unit) converts optical signals into electrical signals. Other functions will be described later.

A multicast group management apparatus for IP broadcasting 10 of this embodiment includes an IP broadcasting channel identifier-multicast address binding table 11 that holds correspondences between broadcasting channel identifiers and multicast addresses, a multicast address pool table 12 for managing a list of multicast addresses usable in the network, and an IP broadcasting channel management table 13 for managing a list of IP broadcasting channel identifiers usable in the network.

The IP broadcasting channel identifier-multicast address binding table 11 previously includes IP broadcasting channel identifiers and multicast addresses that are set in the IP broadcasting server. The multicast address pool table 12 initially includes multicast addresses usable in the network. The IP broadcasting channel management table 13 previously includes IP broadcasting channel identifiers that can be broadcast over the network.

The multicast group management apparatus for IP broadcasting 10 further includes an I/O interface 14 through which messages are transmitted and received to and from the IP broadcasting terminal 30, a CPU (Central Processing Unit) 15 that functions as a processing unit to process the messages, and a memory 16 in which a program is held.

The CPU 15 extracts a broadcasting channel ID (identifier) from a message 73 received from the IP broadcasting terminal 30 or a message 72 received from an IP broadcasting portal server, and decides a multicast address corresponding to the IP broadcasting channel identifier from the multicast address binding table 11 according to the program held in the memory 16. Then, the CPU 15 creates a message 74 including the decided multicast address, and outputs it to the I/O interface 14 for transmission to the IP broadcasting terminal.

In the multicast group management apparatus for IP broadcasting 10, the CPU 15 receives a request to allocate a multicast address to the IP broadcasting channel identifier from the IP broadcasting server 20, decides a multicast address based on the IP broadcasting channel management table 13 and the multicast address pool table 12, and passes it to the IP broadcasting server 20. The CPU 35 updates the IP broadcasting channel identifier-multicast address binding table 11 according to the IP broadcasting channel identifier and the decided multicast address.

The IP broadcasting terminal 30 of this embodiment, which functions as a transmitting/receiving unit, includes a GE interface (Gigabit Ethernet Interface) 31 through which IP packets are received, a packet processing unit 32 that selects and processes an IP packet to be received, an MPEG (Moving Picture Expert Group) processing unit 33 that processes video from the packet, the CPU 35 that controls them and processes messages, a memory 36 in which a program executed by the CPU 35 is held, and a cache memory 34 whose functions will be described later. A storing unit of the IP broadcasting terminal 30 is constituted by the cache memory 34 and the memory 36. It goes without saying that the packet processing unit 32 and the MPEG processing unit 33 may be constructed not only by hardware but also by software processes. In this case, the software processes are also performed by the CPU 35.

In the IP broadcasting terminal 30, as a first method, the CPU 35 creates the message 73 including an IP broadcasting channel identifier from a user's IP broadcasting channel selection request 70, for example, input from a remote controller, and transmits the message to the multicast group management apparatus for IP broadcasting 10. As a second method, access is made to the IP broadcasting portal server 50 by HTTP or the like to create a message 72 including an IP broadcasting channel identifier, and the message may be transmitted to the multicast group management apparatus for IP broadcasting 10. In the embodiment below, the first method is used for description. However, the present invention is not limited to the embodiment.

After that, the CPU 35 decides multicast address information from a message 74 received from the multicast group management apparatus for IP broadcasting 10, and passes it to the packet processing unit 32. The packet processing unit 32 transmits a video reception request message 75 to a multicast group according to the passed multicast address, and after reception has become possible, selects and processes an IP packet. For example, as a join message, a join message of IGMPv2 of RFC (Request for Comments) 2236 can be used.

In the IP broadcasting terminal 30, the CPU 35 updates the cache memory 34 according to the multicast address received from the multicast group management apparatus for IP broadcasting 10, and the IP broadcasting channel identifier. By searching the cache memory from the next time, the response time of IP broadcasting channel selection improves.

Figure 2:
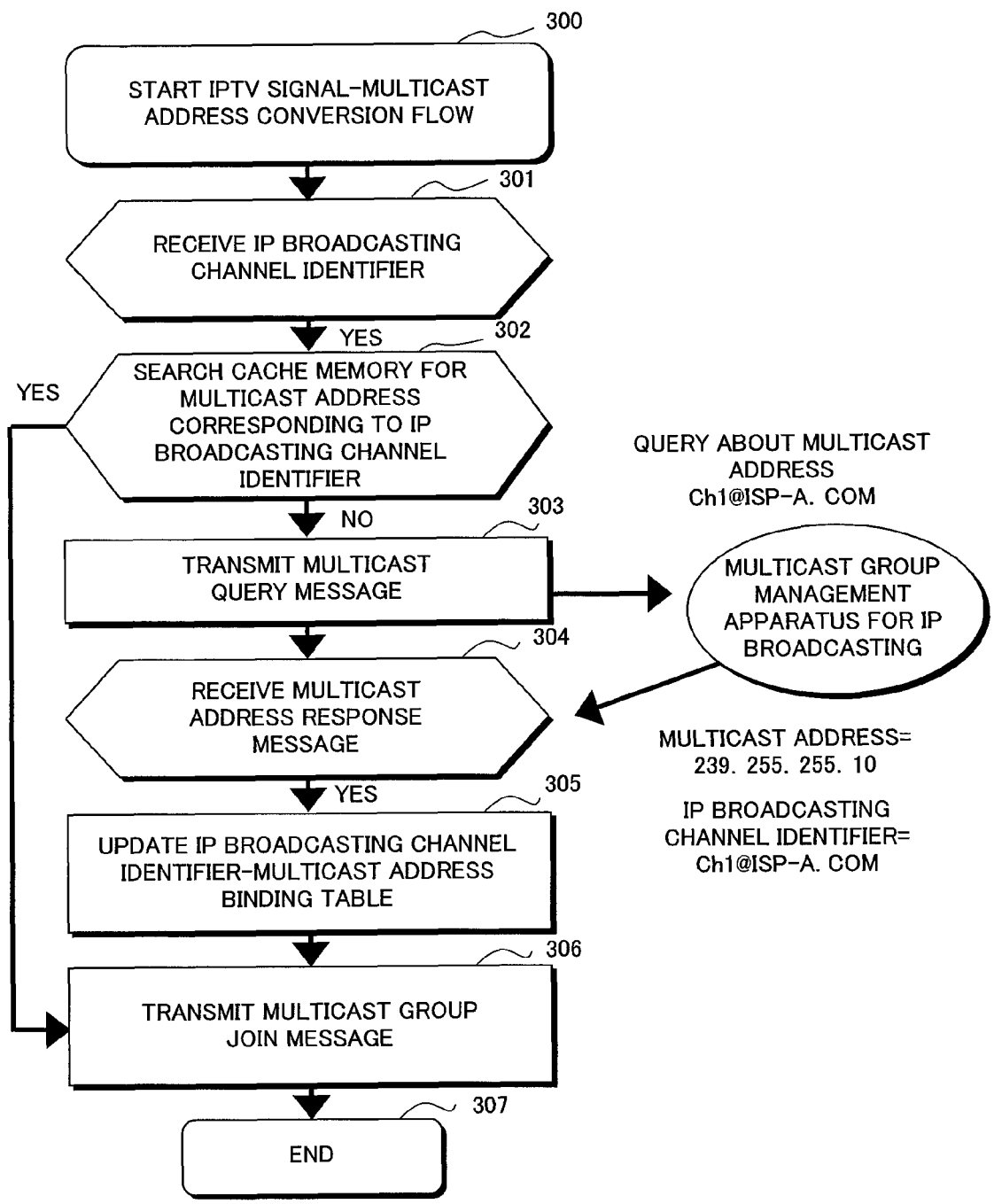
FIG. 2 is a flowchart of a multicast address solution operation performed by an IP broadcasting terminal of a first embodiment.

FIG. 2 is a flowchart of a multicast address solution operation performed by the IP broadcasting terminal 30 of this embodiment. Here, a description is made of an example of the IP broadcasting terminal in the IP broadcasting system that performs IP broadcasting services of this embodiment. That is, a description is made of the processing flow that the IP broadcasting terminal 30 selectively receives IP packets of broadcasting video from a multicast network, based on an IP broadcasting channel identifier. This flowchart is executed, for example, by the CPU 35 of the IP broadcasting terminal 30.

The IP broadcasting terminal 30 determines whether it has received an IP broadcasting channel identifier including IP broadcasting channel information to be viewed by a user (Step 301). On receiving the IP broadcasting channel identifier, it refers to the cache memory to search for a multicast address (MCA: Multicast Address) corresponding to the IP broadcasting channel identifier (Step 302).

Figure 4:
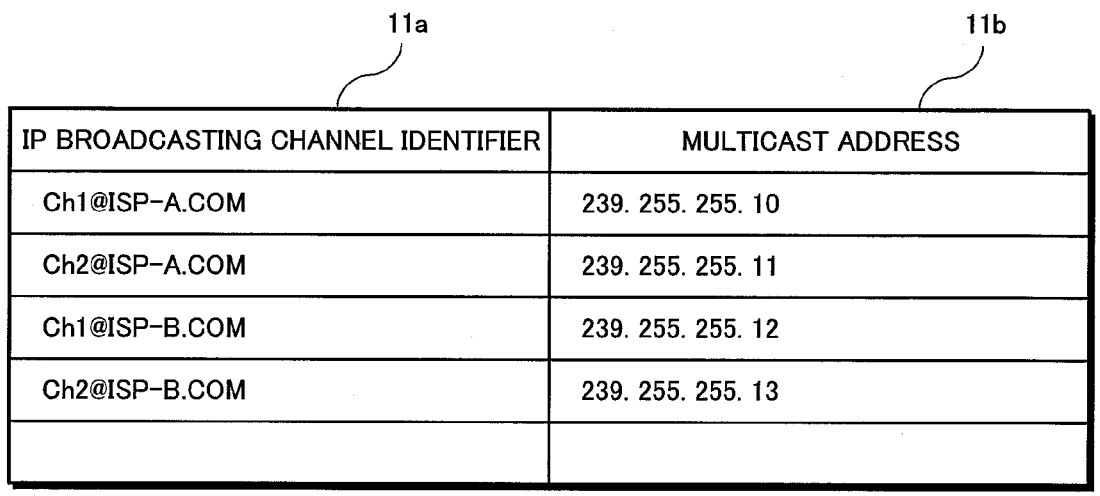
FIG. 4 is a drawing showing an example of the structure of IP broadcast channel identifiers-multicast addresses binding table of a first embodiment.

In the cache memory 34, for example, as shown in FIG. 4, the IP broadcasting channel identifier-multicast address binding table 11 containing a list of IP broadcasting channel identifiers 11a and multicast addresses 11b is stored. In this embodiment, for example, an IP broadcasting channel identifier is "Ch1@ISP-A.COM", and a multicast address is "239.255.255.10".

In Step 302, when a multicast address matching the IP broadcasting channel identifier does not exist in the IP broadcasting channel identifier-multicast address binding table 11, the IP broadcasting terminal 30 transmits a multicast address query message including the IP broadcasting channel identifier (Step 303).

Figure 6A:
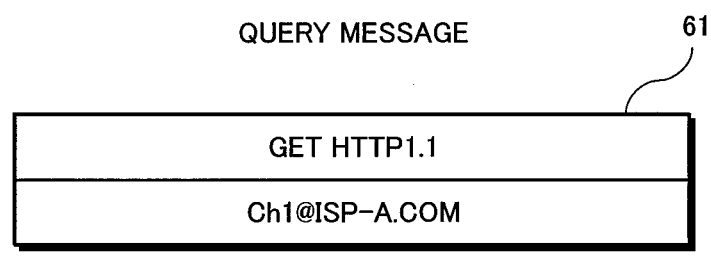
FIGS. 6A and 6B are drawings showing message format examples of a first embodiment.

In this embodiment, a query message 61, for example, includes an IP broadcasting channel identifier as shown in FIG. 6A. As the format of the message, SIP URL (Session Initiation Protocol Uniform Resource Locator), XML (Extensible Markup Language), and the like may be used. The IP broadcasting channel identifier has only to be information identifying an IP broadcasting channel.

Figure 6B:
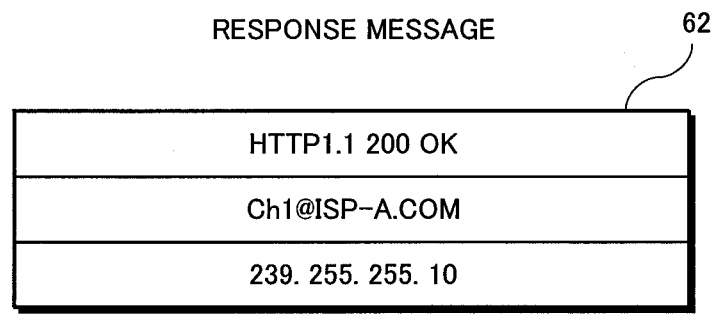

Next, the IP broadcasting terminal 30 determines whether it has received a multicast address response message including the transmitted IP broadcasting channel identifier and a corresponding multicast address (Step 304). When the multicast address response message has been received, the IP broadcasting channel identifier and the multicast address are registered, and the IP broadcasting channel identifier-multicast address binding table is updated (Step 305). In this embodiment, the response message 62, for example, includes the IP broadcasting channel identifier and the corresponding multicast address as shown in FIG. 6B. As the format of the message, SIP URL, XML, and the like may be used. IPv4 and IPv6 are also permitted as the multicast address.

When the multicast address response message has been received, or when a multicast address matching the IP broadcasting channel identifier exist in the IP broadcasting channel identifier-multicast address binding table 11 stored in cache memory in Step 302, the IP broadcasting terminal 30 transmits a multicast group join message to the multicast network 40 (Step 306). As a result, IP packets for transmitting IPTV broadcasting channel data indicated by the IP broadcasting channel identifier can be received. The IP broadcasting terminal may not include the IP broadcasting channel identifier-multicast address binding table 11. In this case, neither Step 302 nor Step 305 is necessary in the flowchart of this embodiment.

Thus, the IP broadcasting terminal 30 can reproduce the IP broadcasting channel by receiving IP packets corresponding to the IP broadcasting channel identifier.

Figure 3:
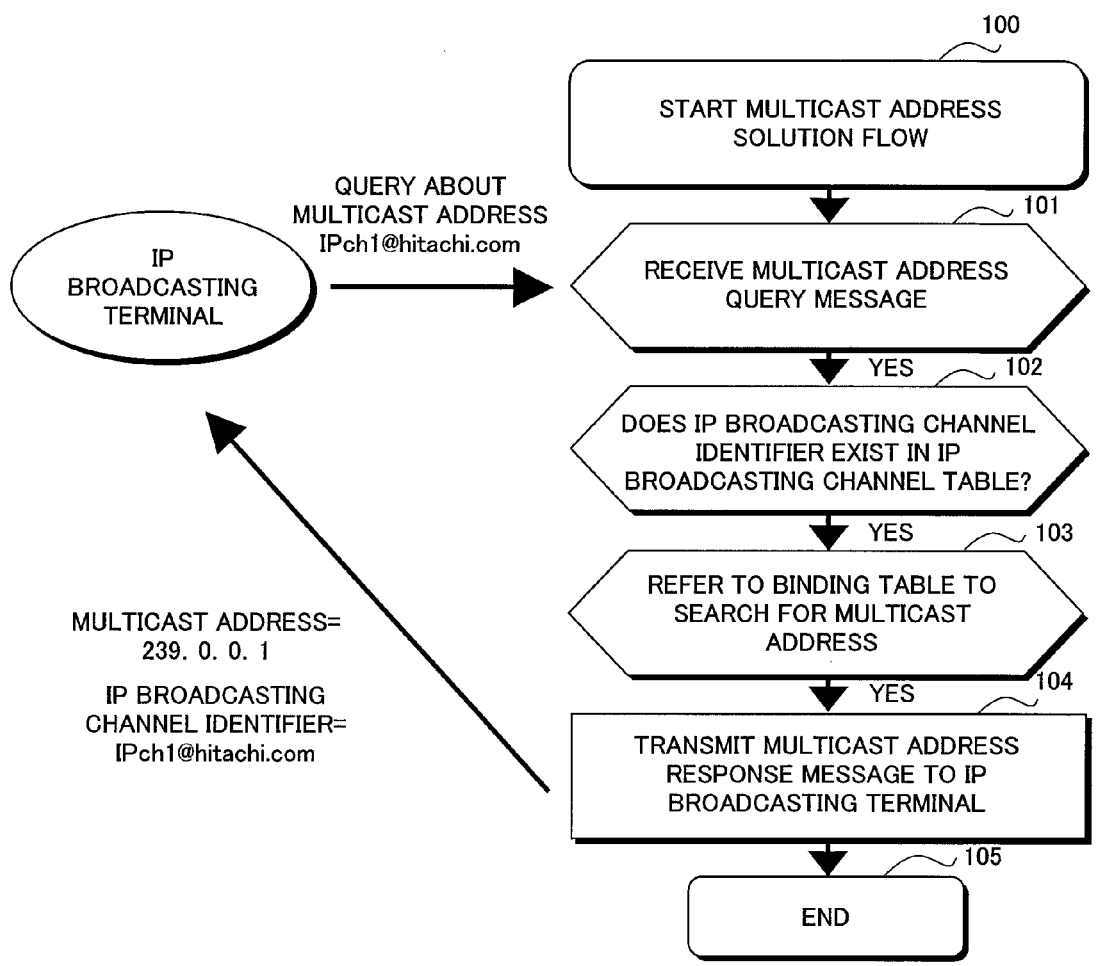
FIG. 3 is a flowchart of a multicast address solution operation performed by a multicast address management apparatus for IP broadcasting of a first embodiment.

FIG. 3 is a flowchart of a multicast address solution operation performed by the multicast address management apparatus for IP broadcasting 10 necessary to the IP broadcasting system of the first embodiment. That is, a description is made of the processing flow that the multicast group management apparatus for IP broadcasting 10 returns a multicast address in response to a query from the IP broadcasting terminal 30. In this embodiment, this flowchart is executed, for example, by the CPU 15 of the multicast group management apparatus for IP broadcasting 10.

The multicast group management apparatus for IP broadcasting 10 determines whether it has received a multicast address query message including an IP broadcasting channel identifier (Step 101). On receiving the multicast address query message, it extracts an IP broadcasting channel identifier from the multicast address query message, and refers to the IP broadcasting channel management table 13 to determine whether the IP broadcasting channel identifier exists (Step 102).

Figure 5:
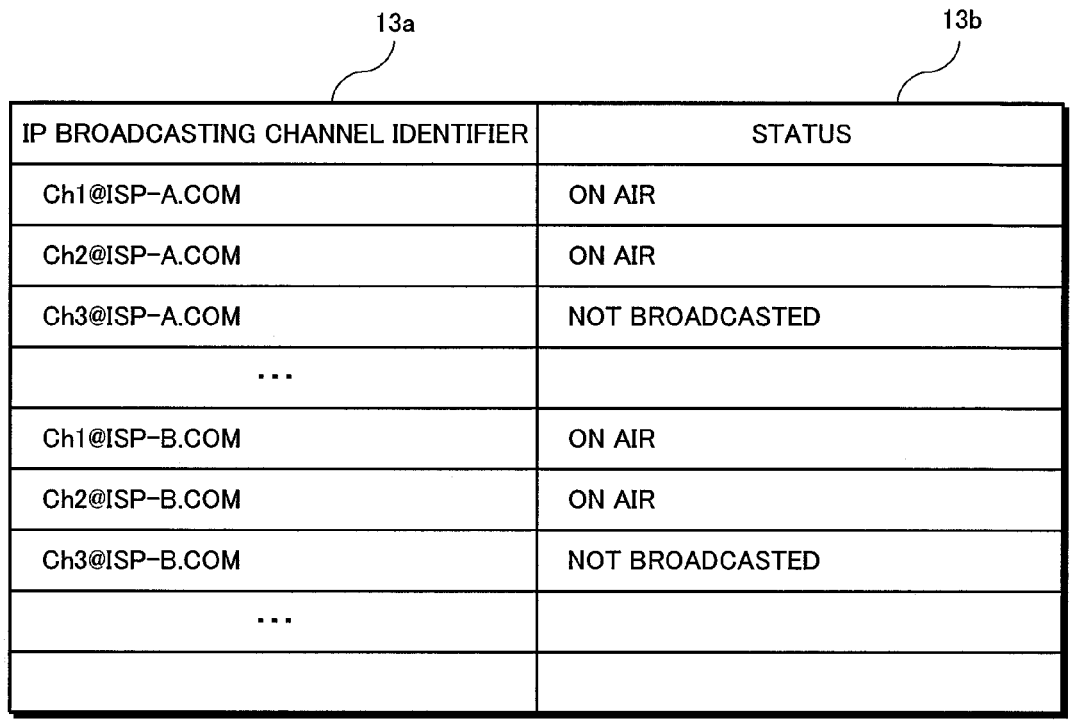
FIG. 5 is a drawing showing an example of the structure of an IP broadcasting channel management table of a first embodiment.

In the IP broadcasting channel management table 13, for example, as shown in FIG. 5, information indicating a status corresponding to IP broadcasting channel identifiers is stored. In this embodiment, an IP broadcasting channel identifier 13a is "Ch1@ISP-A.COM", and a status 13b corresponding to it is "On the air". The IP broadcasting channel management table may contain other information items.

In Step 102, when the IP broadcasting channel identifier exists, the multicast group management apparatus for IP broadcasting 10 refers to the IP broadcasting channel identifier-multicast address binding table 11 to search for a corresponding multicast address (Step 103).

In this embodiment, the IP broadcasting channel identifier-multicast address binding table 11 contains a list of IP broadcasting channel identifiers 11a and corresponding multicast addresses 11b as shown in FIG. 4. The IP broadcasting channel identifier-multicast address binding table is previously provided in the multicast group management apparatus for IP broadcasting 10. For example, an IP broadcasting channel identifier 11a is "Ch1@ISP-A.COM", and a multicast address 11b corresponding to it is "239.255.255.10".

In Step 103, when a corresponding multicast address 11b exists, the CPU 15 generates a multicast address response message including the multicast address 11b, and transmits it to the IP broadcasting terminal (Step 104). As a result, the IP broadcasting terminal 30 can selectively receive IP packets, based on the multicast address 11b.

Figure 7:
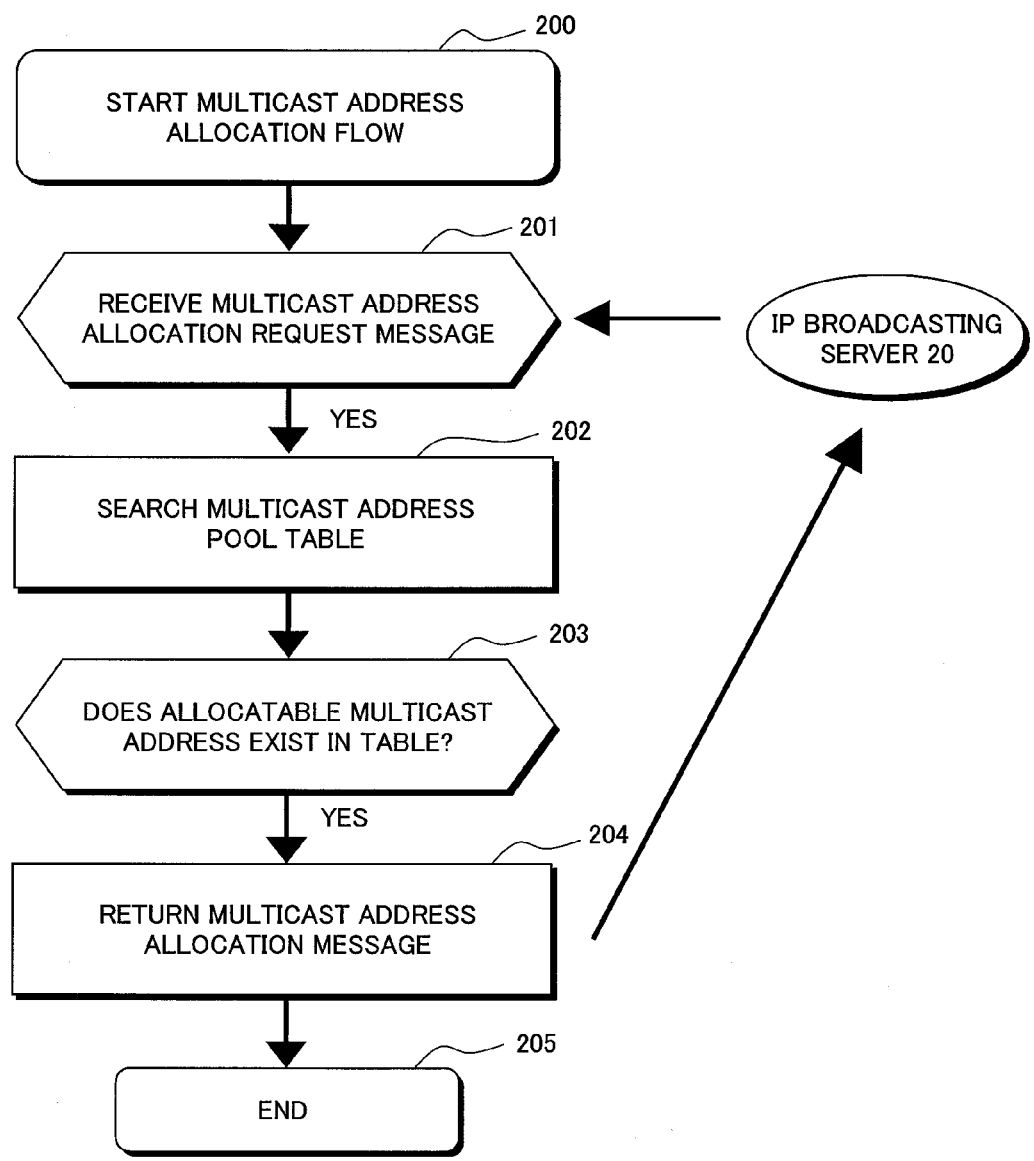
FIG. 7 is a flowchart of a multicast address allocation operation performed by a multicast address management apparatus for IP broadcasting of a first embodiment.

FIG. 7 is a flowchart of a multicast address allocation operation performed by the multicast address management apparatus for IP broadcasting 10 that manages IP broadcasting services of the present invention. In this embodiment, a description is made of the processing flow that the multicast group management apparatus for IP broadcasting 10 allocates a multicast address in response to a multicast address allocation request from the IP broadcasting server 30.

The multicast address management apparatus for IP broadcasting 10 determines whether it has received a multicast address request message including an IP broadcasting channel identifier from the IP broadcasting server 30 (Step 201). On receiving a multicast address request message, it extracts an IP broadcasting channel identifier from the multicast address request message, and refers to the multicast address pool table 12 to determine whether an allocatable multicast address exists (Steps 202 and 203).

In the multicast address pool table 12, for example, as shown in FIG. 8, multicast addresses 12a and information 12b indicating an allocation status corresponding to them are stored. In this embodiment, a multicast address 12a is "224.0.0.0", and an allocation status 12b corresponding to it is "Allocatable". The multicast address pool table 12 may contain other information items.

In Step 203, when an allocatable multicast address exists, the multicast address management apparatus for IP broadcasting 10 refers to the multicast address pool table 12, generates a multicast address allocation message including the allocatable multicast address, and transmits the message to the IP broadcasting server (Step 204). It changes an allocation status in the multicast address pool table 12 to "Allocated". In the IP broadcasting channel identifier-multicast address binding table 11, it updates the data of IP broadcasting channel identifier information and multicast information.

As a result, the IP broadcasting server 20 transmits IP packets, based on the allocated multicast address. By this processing, the multicast group management apparatus for IP broadcasting 10 can centrally manage multicast addresses, and can quickly respond to queries from the IP broadcasting terminal.

Figure 9:
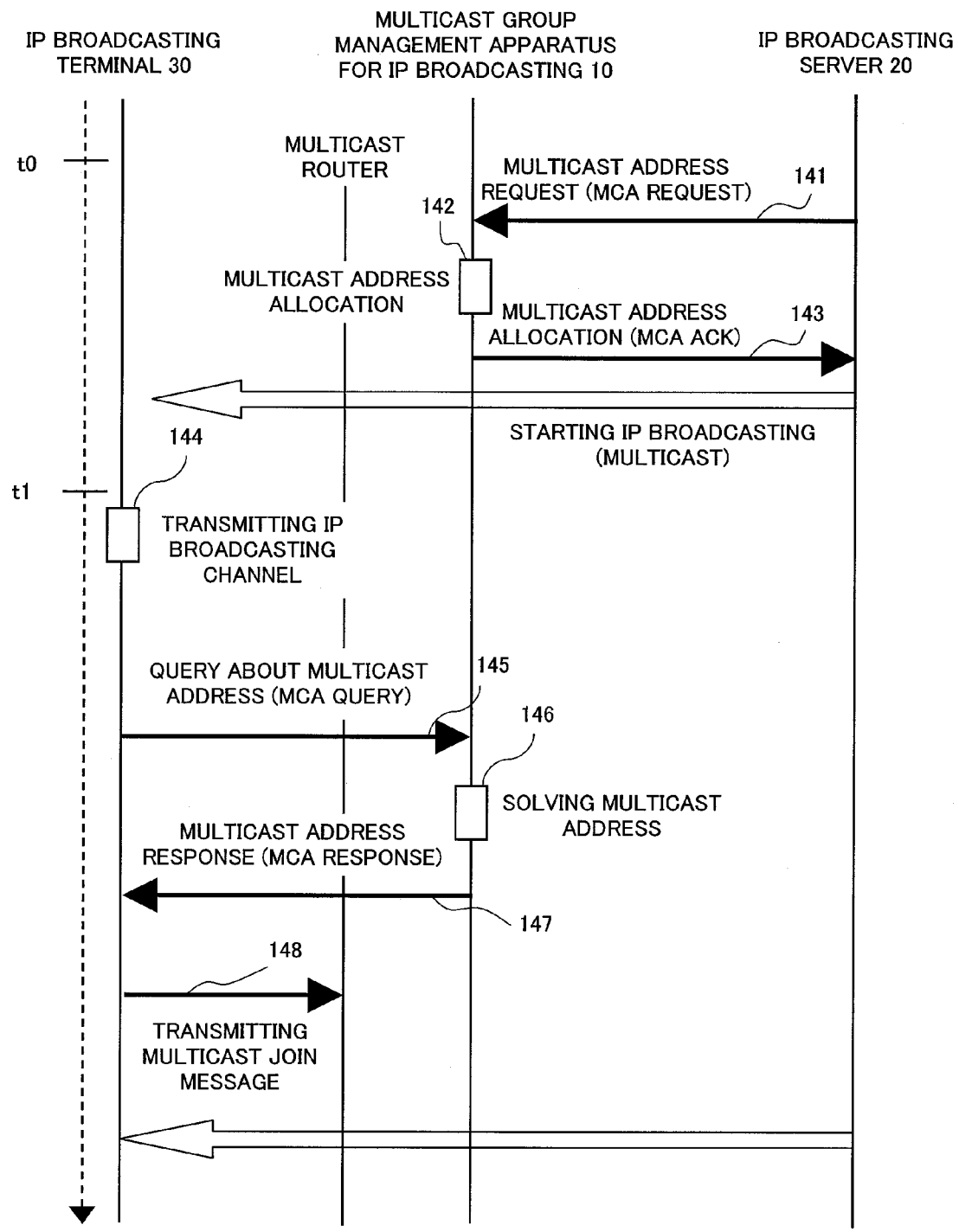
FIG. 9 is a basic message sequence diagram in an IP broadcasting communication system of a first embodiment.

FIG. 9 is a drawing showing a message sequence for explaining the entire IP broadcasting system in the above-described first embodiment. At time to, a multicast address request message transmitted from the IP broadcasting server 20 is received by the multicast group management apparatus for IP broadcasting 10 (Step 141). The multicast group management apparatus for IP broadcasting 10, as shown in FIG. 7, refers to the multicast address pool table 12 to decide a multicast address (Step 142), and transmits a multicast address allocation message to the IP broadcasting server 30 (Step 143). As a result, the IP broadcasting server 20 transmits an IP packet including the allocated multicast address to start IP broadcasting. At this point, the IP packet is transmitted to the multicast network 40 but not received in the IP broadcasting terminal 30.

Next, to view IP broadcasting, the user inputs or transmits a signal including the IP broadcasting channel identifier to the IP broadcasting terminal 30 by using an IP broadcasting channel selection request 70 (Step 144). The IP broadcasting terminal 30, as shown in FIG. 2, transmits a multicast address query message including the IP broadcasting channel identifier to the multicast group management apparatus for IP broadcasting 10 (Step 145).

The multicast group management apparatus for IP broadcasting 10, as shown in FIG. 3, refers to the received IP broadcasting channel identifier and the IP broadcasting channel-identifier multicast address binding table 11 to decide a corresponding multicast address (Step 146), and transmits a multicast address response message including the decided multicast address to the IP broadcasting terminal 30 (Step 147).

The IP broadcasting terminal 30 analyzes the received multicast address response message to decide a multicast address to be received, transmits a multicast group join message to a multicast router, and after the IP broadcasting terminal 30 has become ready for reception, selectively receives IP packets (Step 148). As a result, the IP broadcasting terminal 30 can receive broadcasting video IP packets, and the user can view IP broadcasting.

Figure 10:
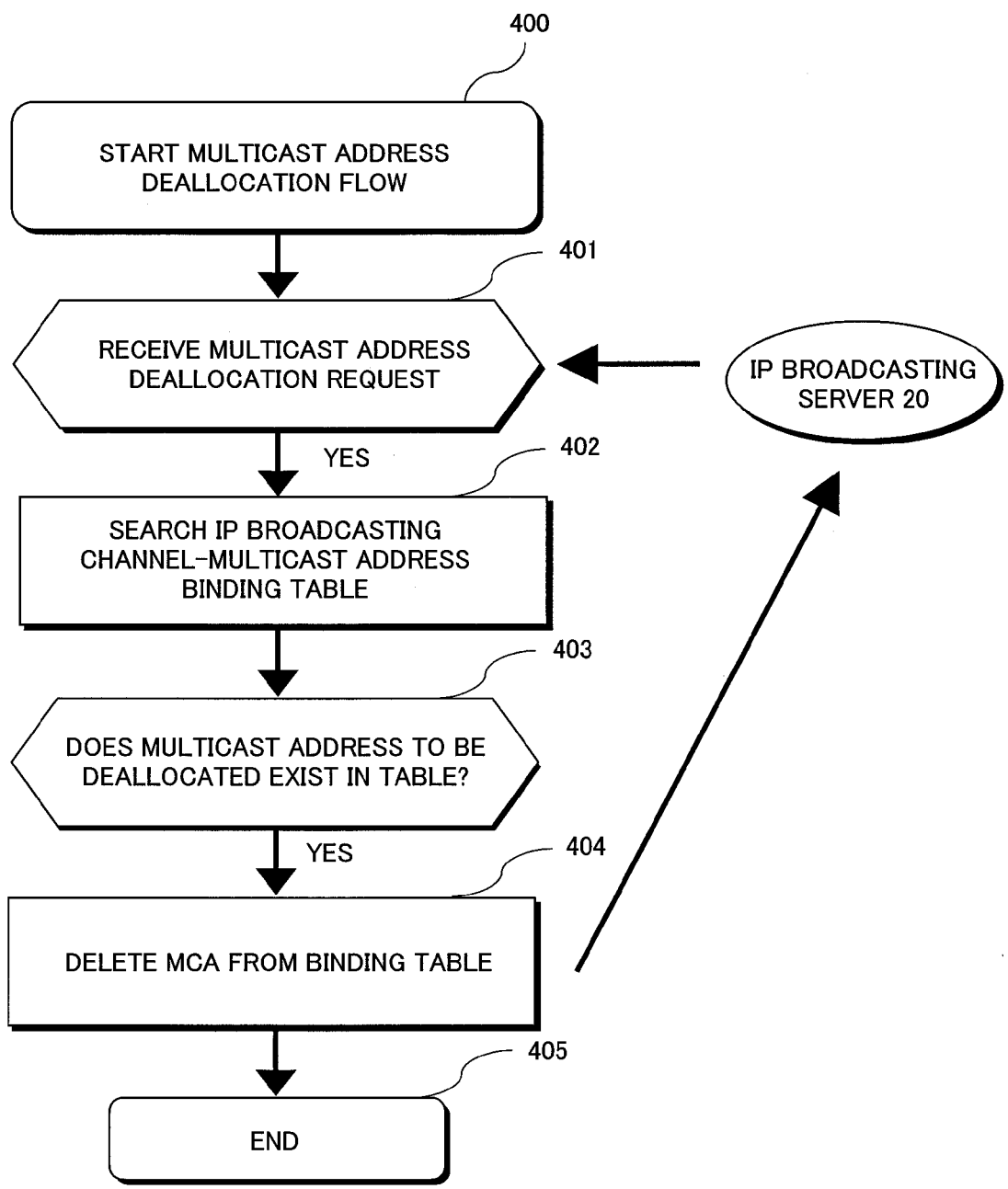
FIG. 10 is a flowchart of a multicast address deallocation operation performed by a multicast address management apparatus for IP broadcasting of a first embodiment.

FIG. 10 shows a flowchart of a multicast address deallocation operation performed by the multicast group management apparatus for IP broadcasting 10 of the present invention. With reference to FIG. 10, a description is made of the processing flow that the multicast group management apparatus for IP broadcasting 10 deallocates a multicast address in response to a request to deallocate a multicast address from the IP broadcasting server 20. This operation flow is executed by the CPU 15 of the multicast group management apparatus for IP broadcasting 10.

The multicast group management apparatus for IP broadcasting 10 determines whether it has received a multicast address deallocation request message (MCA Return) including an IP broadcasting channel identifier from the IP broadcasting server 20 over the network (Step 201). On receiving the multicast address deallocation request message, it extracts the IP broadcasting channel identifier and a multicast address from the multicast address deallocation request message, and refers to the IP broadcasting channel identifier-multicast address binding table 11 to determine whether the received IP broadcasting channel identifier and multicast address exist (Steps 402 and 403).

When the IP broadcasting channel identifier and the multicast address exist in Step 403, the CPU 15 deletes the received IP broadcasting channel identifier and multicast address from the IP broadcasting channel identifier-multicast address binding table 11, generates a multicast address deallocation response message (MCA Return ACK), and transmits it to the IP broadcasting server (Step 404). It changes the allocation status in the multicast address pool table 12 to "Allocatable". Furthermore, it changes the status in the IP broadcasting channel management table 13 to "Not broadcasted". As a result, the IP broadcasting server 20 returns the right to use the multicast address to the multicast group management apparatus for IP broadcasting 10. Accordingly, it becomes possible to reuse the multicast address, so that the multicast network 40 can be efficiently operated.

Figure 11:
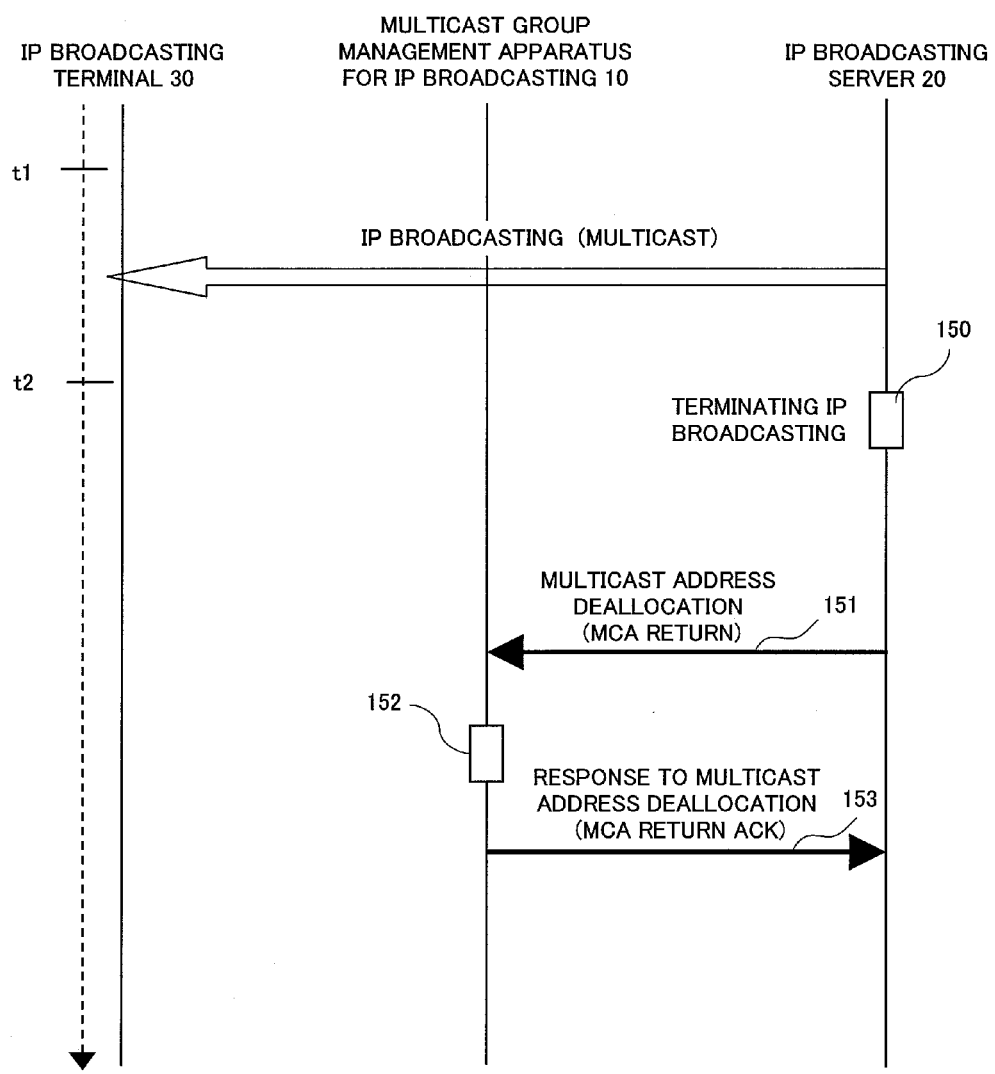
FIG. 11 is a message sequence diagram of multicast address deallocation of a first embodiment.

FIG. 11 is a drawing for explaining the above-described multicast address deallocation sequence. The IP broadcasting server 20 terminates IP broadcasting at time t2 (Step 150). Next, the IP broadcasting server 20 transmits a multicast address deallocation request message (MCA Return) to the multicast group management apparatus for IP broadcasting 10 (Step 151). The multicast group management apparatus for IP broadcasting 10, as shown in FIG. 10, refers to the multicast binding table 11 to deallocate the multicast address (Step 152), and transmits a multicast address deallocation response message (MCA Return ACK) to the IP broadcasting server 30 (Step 153). As a result, the IP broadcasting server 20 returns the right to use the multicast address, and the multicast group management apparatus for IP broadcasting 10 is able to reuse the multicast address.

Figure 12:
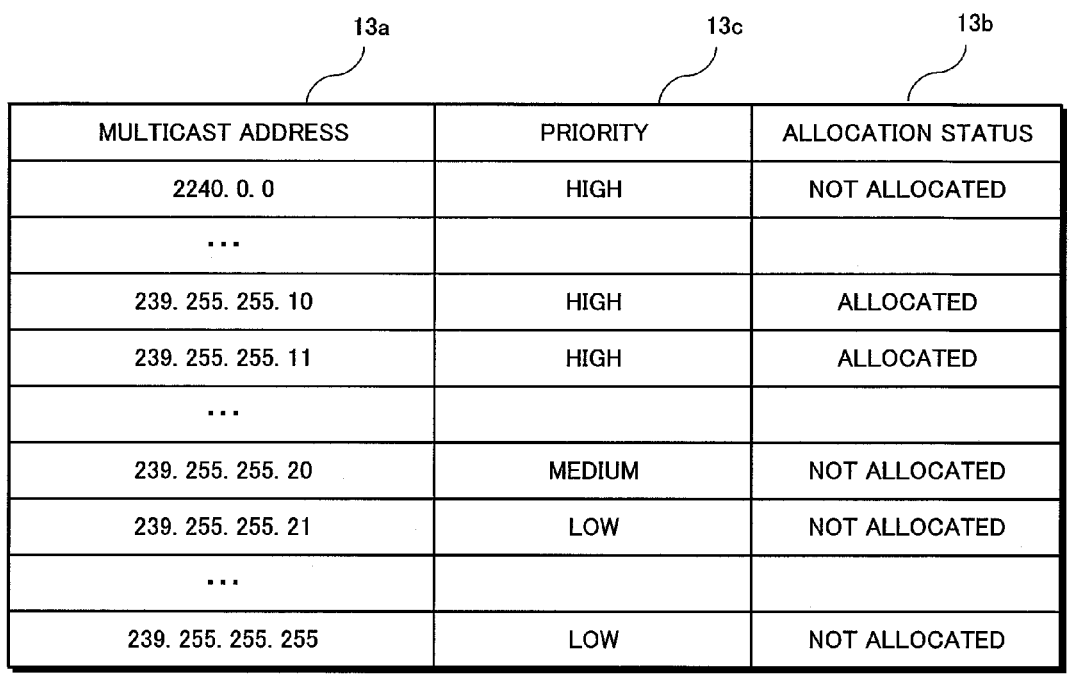
FIG. 12 is a drawing showing an example of the structure of a multicast address pool table of a first embodiment.

FIG. 12 shows another example of the multicast address pool table 12 in the multicast group management apparatus for IP broadcasting 10 in the system of this embodiment. The multicast group management apparatus for IP broadcasting 10 previously stores information for allocating multicast addresses in the multicast network 40.

In this example, as apparent from FIG. 12, unlike the table shown in the FIG. 8, in addition to the multicast address 13a and the allocation status 13b, the priority of transferring IP packets 13c is included as an information item. Thereby, the multicast group management apparatus for IP broadcasting 10, for example, when receiving a multicast address request of high priority from the IP broadcasting server, can allocate a multicast address satisfying the condition.

FIG. 13 shows another example of the multicast address pool table in this embodiment. In this example, in addition to the multicast address 13a and the allocation status 13b, information 13d about a network area where IP packets can be transmitted by the multicast address 13a is included as an information item. Thereby, the multicast group management apparatus for IP broadcasting 10, for example, when receiving a request of a multicast address 13a for performing IP broadcasting with an area limited from the IP broadcasting server 20, can allocate a multicast address 13a satisfying the condition.

Figure 14:
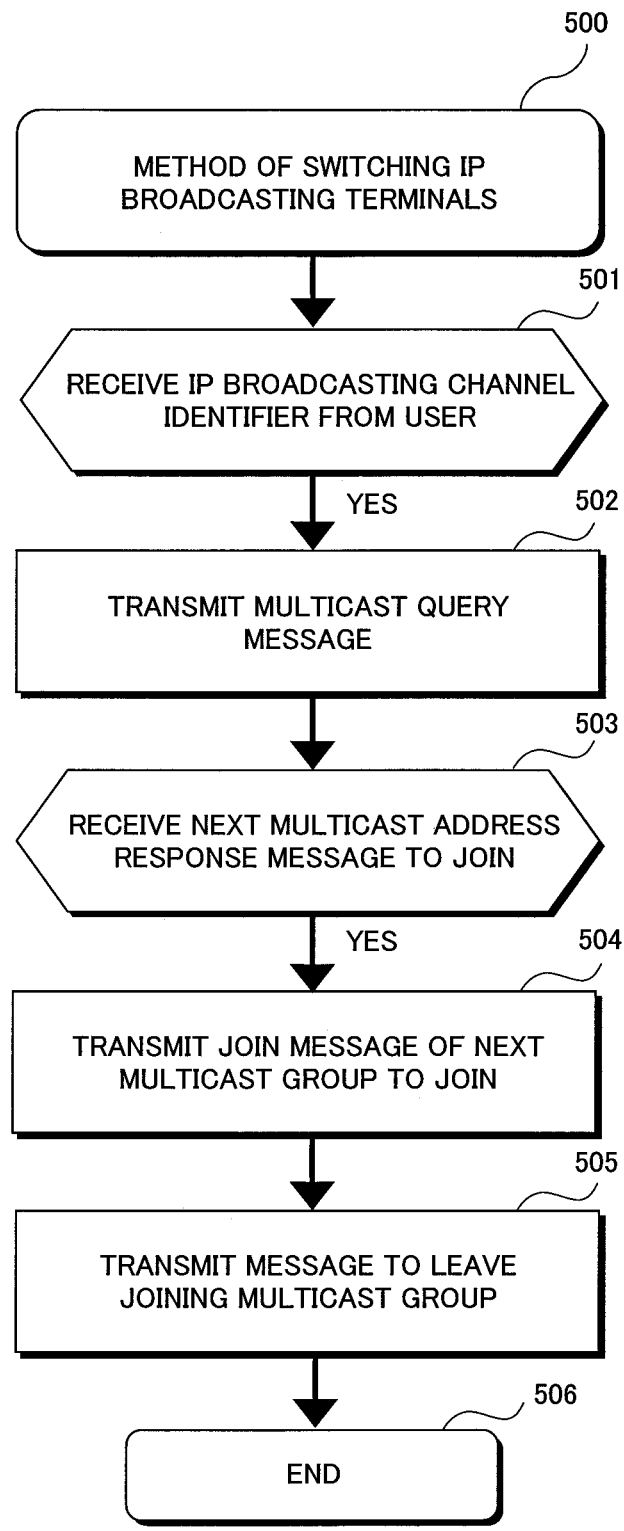
FIG. 14 is a flowchart of a channel switching operation performed by an IP broadcasting terminal of a first embodiment.

FIG. 14 shows a flowchart of a channel switching operation performed by the IP broadcasting terminal in this embodiment. Presently, the IP broadcasting terminal 30 is receiving IP broadcasting indicating a multicast address "A". The IP broadcasting terminal 30 determines whether it has received an IP broadcasting channel identifier including IP broadcasting channel information to be newly viewed by the user (Step 501). On receiving the IP broadcasting channel identifier, it transmits a multicast address query message including the IP broadcasting channel identifier (Step 502).

Next, the IP broadcasting terminal 30 determines whether it has received a multicast address response message including the transmitted IP broadcasting channel identifier and a corresponding multicast address "B" (Step 503). On receiving the multicast address response message, it transmits a message to join a multicast group "B" to the multicast network (Step 504). At the same time, it transmits a message to leave a multicast group "A" to the multicast network (Step 505). Thereby, an IP broadcasting channel can be switched from the IP broadcasting channel indicating the multicast group "A" to the IP broadcasting channel indicating the multicast group "B". Although Steps 504 and 505 are not fixed in order, precedent execution of Step 504 shortens user's channel switching time.

Figure 15:
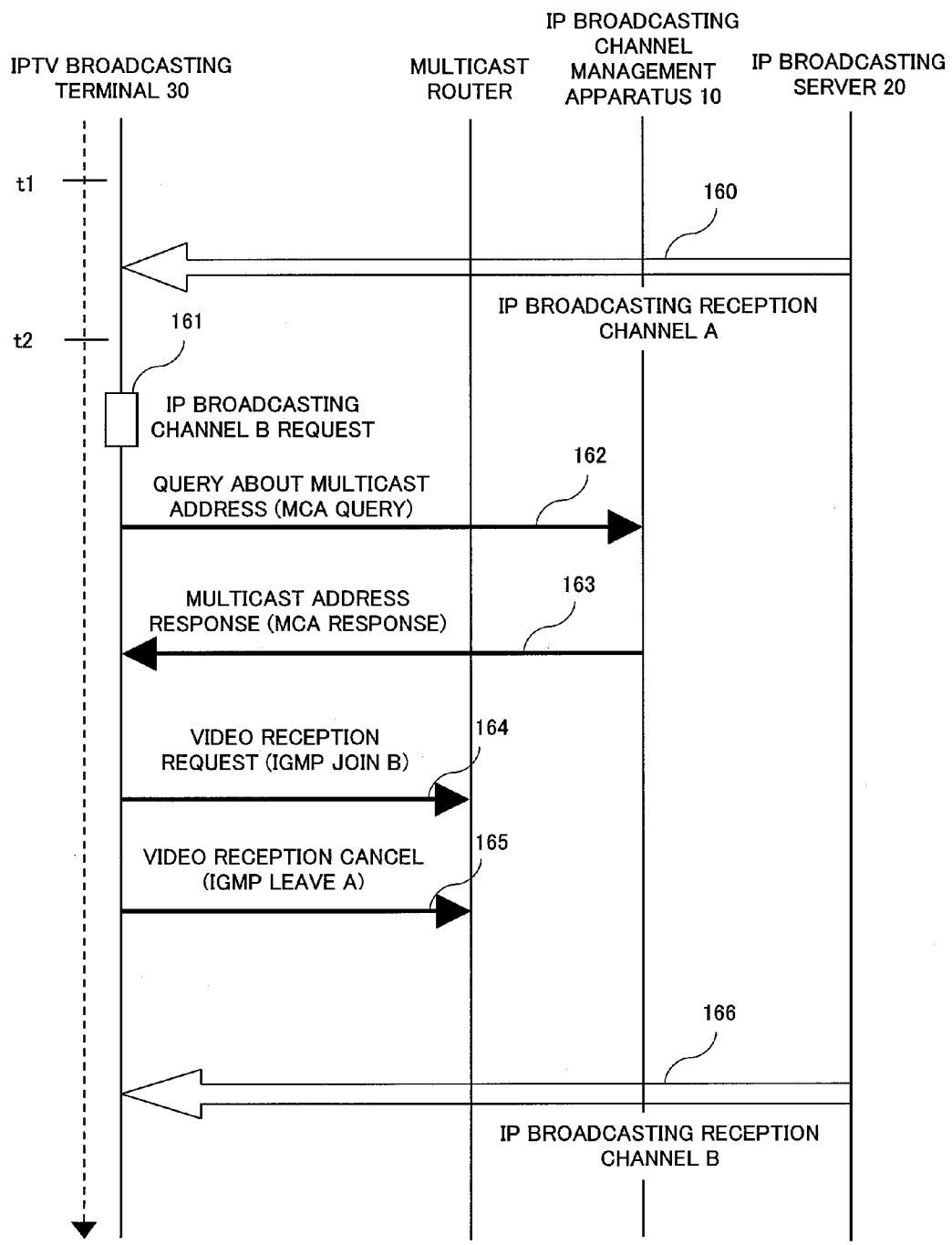
FIG. 15 is a message sequence diagram of channel switching performed by an IP broadcasting terminal of a first embodiment.

FIG. 15 is a message sequence diagram of channel switching performed by the IP broadcasting terminal in this embodiment.

At time t1, the IP broadcasting terminal is receiving an IP broadcasting channel indicating the multicast address "A" (Step 160). At time t2, to view an IP broadcasting channel B, the user inputs or transmits an IP broadcasting channel B request signal including an IP broadcasting channel identifier to the IP broadcasting terminal 30 (Step 161). The IP broadcasting terminal 30 transmits a multicast address query message including the IP broadcasting channel identifier to the multicast group management apparatus for IP broadcasting 10 (Step 162). Next, the multicast group management apparatus for IP broadcasting 10 transmits a multicast address response message including the decided multicast address "B" to the IP broadcasting terminal 30 (Step 163).

Next, the IP broadcasting terminal 30 transmits a message to join the multicast group "B" or a video reception request message to a multicast router (not shown) disposed in the multicast network (Step 164). At the same time, the IP broadcasting terminal 30 transmits a message to join the multicast group "A" or a video distribution cancel message (Step 165). Thereby, the IP broadcasting terminal 30 switches from a video of the IP broadcasting channel indicating the multicast group "A" to a video of the IP broadcasting channel indicating the multicast group "B". As described above, by executing the video reception request (IGMP Join B) 16 prior the video reception cancel (IGMP Leave A) 165, the user can shorten channel switching time.

Figure 16:
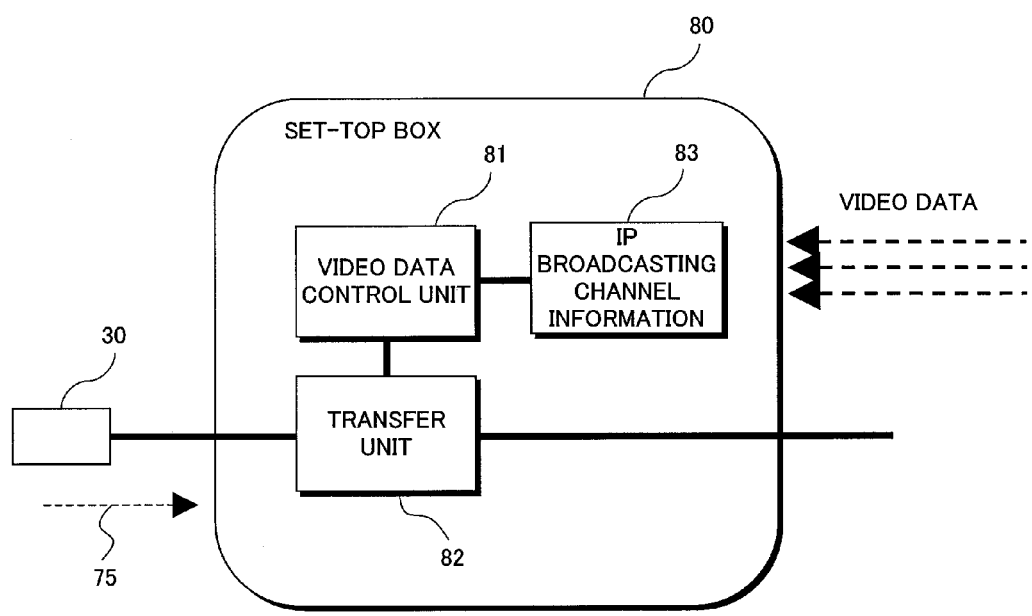
FIG. 16 is a functional diagram for explaining a set-top box for achieving an IP broadcasting communication system of a first embodiment.
Figure 17:
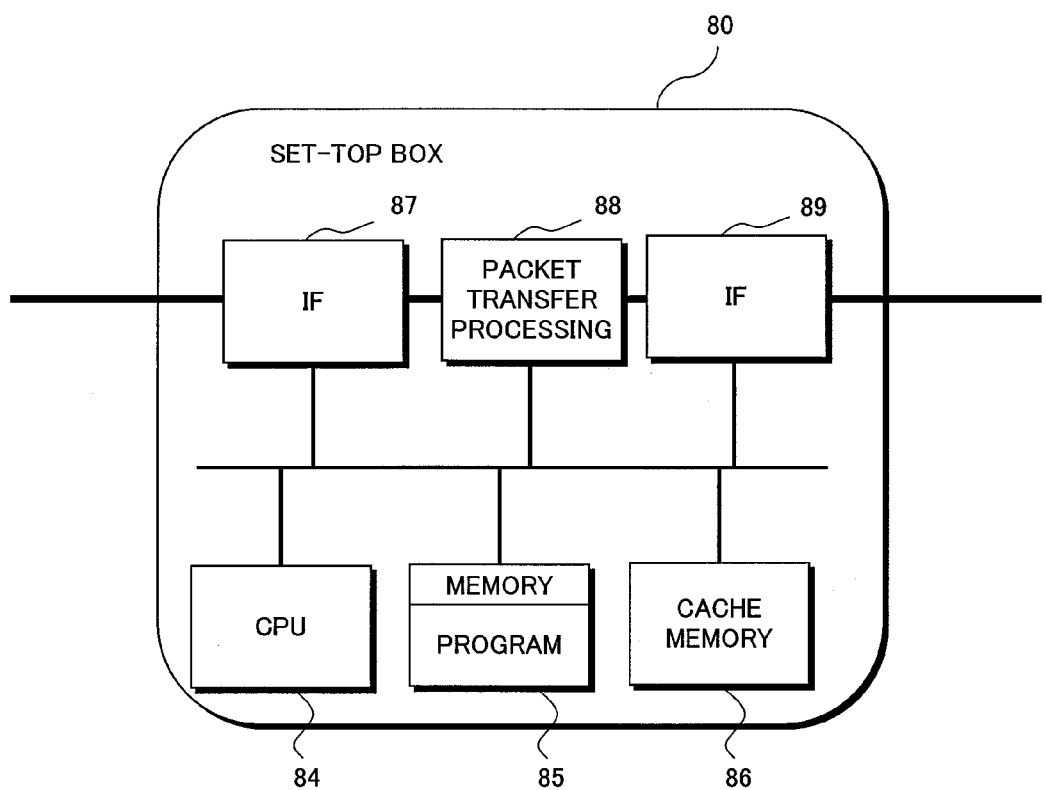
FIG. 17 is a functional diagram for explaining a set-top box for achieving an IP broadcasting communication system of a first embodiment.

With reference to FIGS. 16 to 20, a description is made of a concrete structure and operation of the set-top box 80 for realizing an IP broadcasting system of this embodiment shown in FIG. 1. FIGS. 16 and 17 show examples of the structure of the set-top box 80. FIG. 16 is a block diagram showing its functions. FIG. 17 is a block diagram showing its circuit.

In FIG. 16, the set-top box 80 includes a video data control unit 81, a transfer unit 82, and a memory 83 that stores user information such as IP broadcasting channel information. The video data control unit 81 generates a video distribution request message to the multicast network 40. When receiving a video reception request message 75 from the IP broadcasting terminal 30, it sends a transfer command to the transfer unit 82. The memory 83 stores information about IP broadcasting channels viewable to a user who uses the IP broadcasting terminal 30. In FIG. 16, other function units of the set-top box, such as a media conversion function unit explained earlier and the like are omitted.

The video data control unit 81 previously transmits a video distribution request message, based on IP broadcasting channel information stored in the memory 83. Thereby, the set-top box 80 continues to receive plural pieces of video data. In this state, when the set-top box 80 has received a video reception request message from the IP broadcasting terminal 30, the video data control unit 81 analyzes the received video reception request message, sends a transfer command to the transfer unit 82, and starts to transfer corresponding video data. Thereby, the IP broadcasting terminal 30 can receive video data.

FIG. 17 shows a concrete structure of the set-top box 80 corresponding to FIG. 16. The reference numbers 84, 85, and 86 designate a processing unit (CPU) that executes programs such as transfer control processing, a memory that stores programs and the like, and a cache memory that stores information and data, respectively. In the cache memory 86, the same information as the IP broadcasting channel identifier-multicast address binding table 11 described previously is temporarily stored. 87 and 89 designate units to interface (IF) with the outside as a transmitting/receiving unit of the set-top box 80, and 88 designates a packet transferring unit that transfers packets under control of the CPU 84, a video data control unit 81. Reference numeral 88 corresponds to the transfer unit 82 of FIG. 16.

Figure 18:
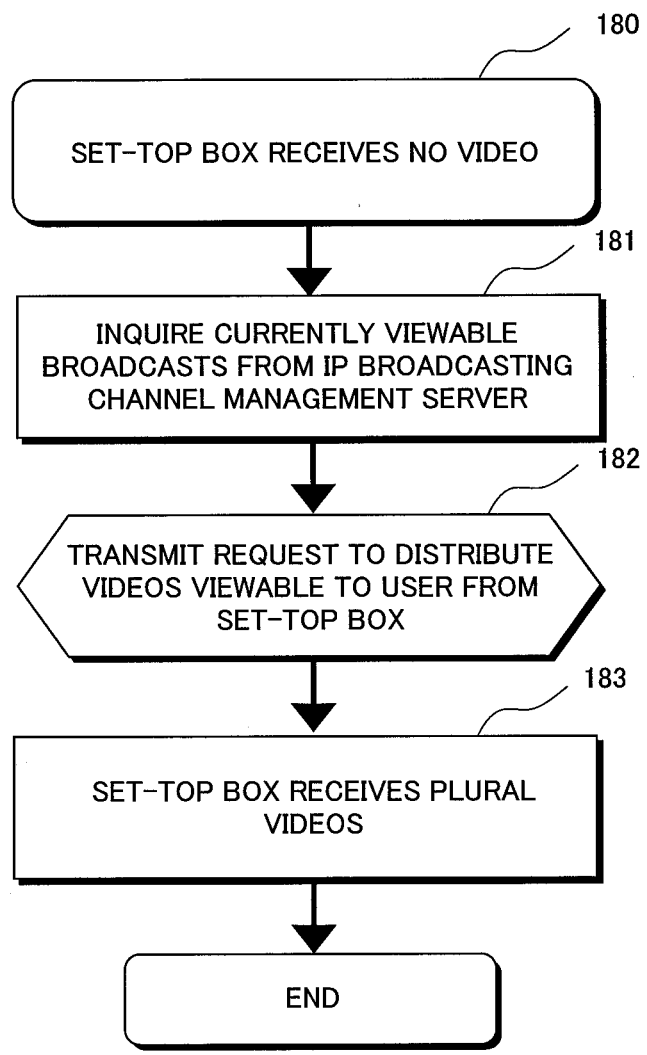
FIG. 18 is a flowchart for explaining the function of a set-top box of a first embodiment.
Figure 19:
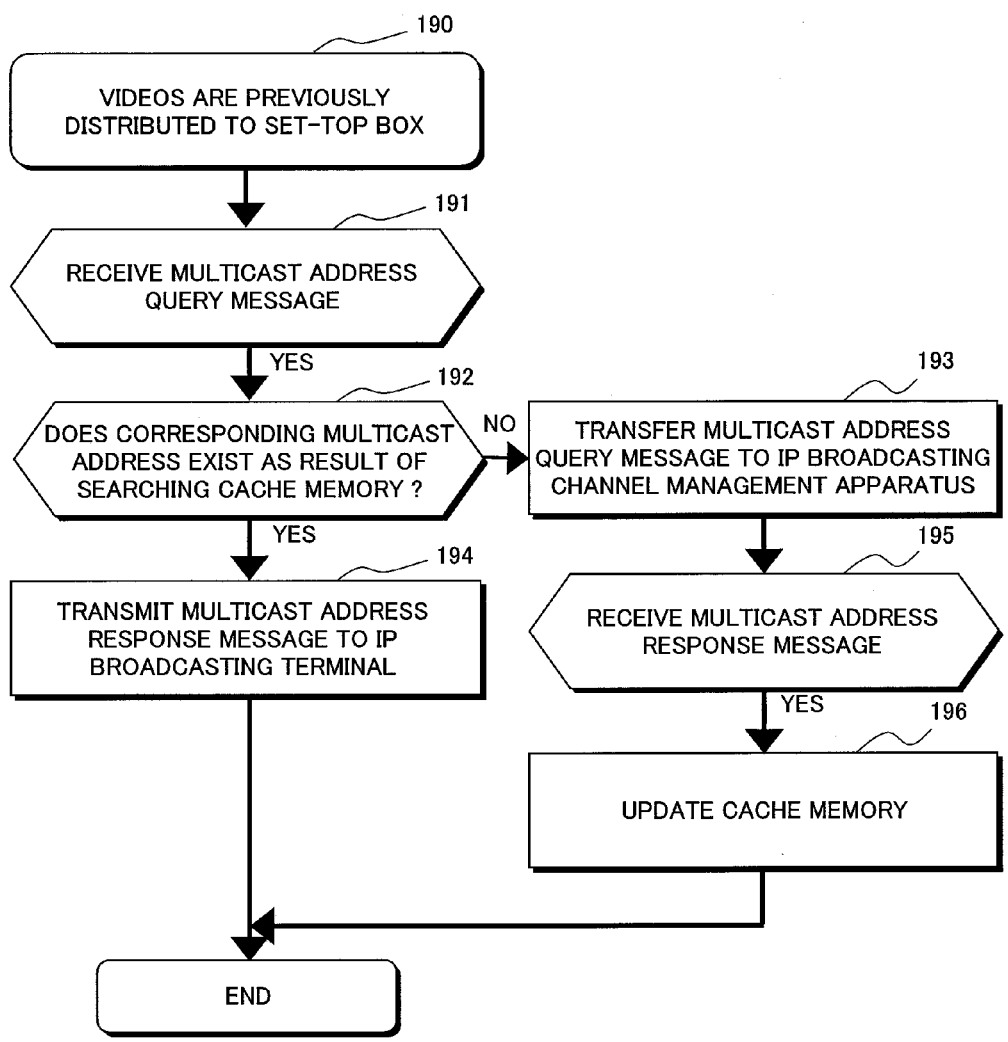
FIG. 19 is a flowchart for explaining the function of a set-top box of a first embodiment.
Figure 20:
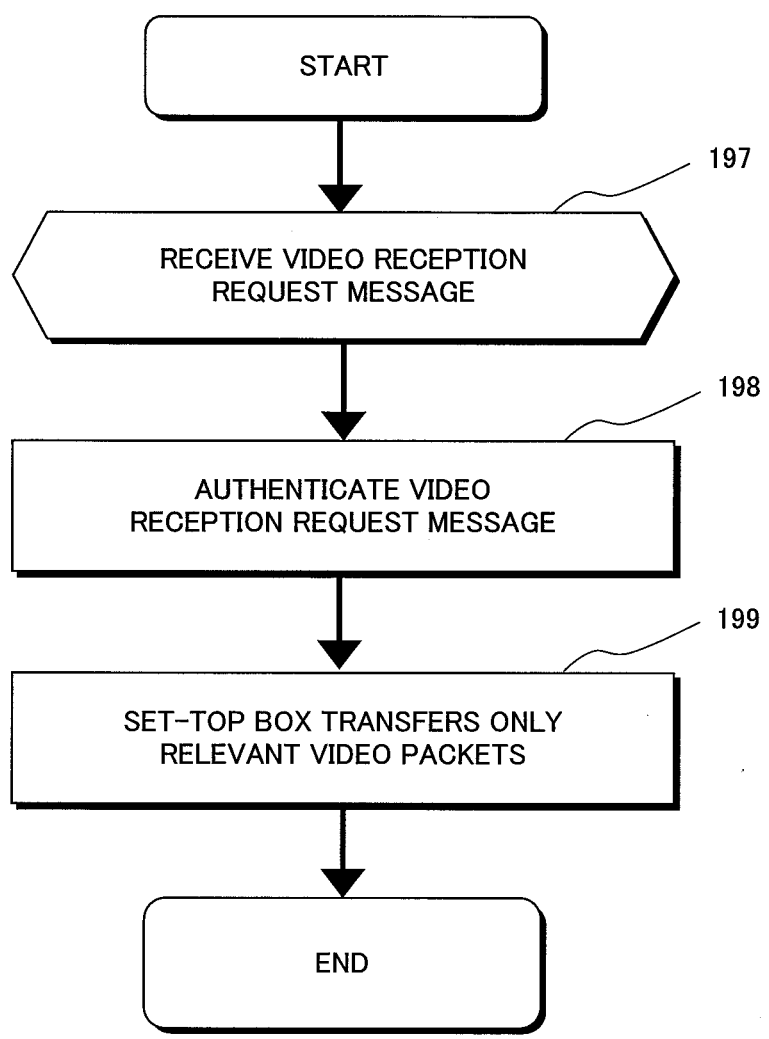
FIG. 20 is a flowchart for explaining the function of a set-top box of a first embodiment.

The following describes an example of concrete operations of the set-top box 80 with reference to FIGS. 18, 19, and 20. In FIG. 18, the set-top box 80 is in an initial state and receives no video (180). The set-top box 80 inquires currently viewable broadcasts from the multicast group management apparatus for IP broadcasting 10, which is an IP broadcasting channel management server (181). Next, the set-top box 80 transmits a request message to distribute videos viewable to the user (182). As a result, the set-top box 80 can receive plural videos corresponding to the transmitted video distribution request message (183).

FIG. 19 assumes that videos are previously distributed to the set-top box 80 (190). In this case, the set-top box 80 receives a multicast address query message, which is a query message including an IP broadcasting channel identifier described previously, from the IP broadcasting terminal 30 (191). The CPU 84 searches the cache memory 86 to determine whether a multicast address corresponding to the IP broadcasting channel identifier exists (192). When it exists, the CPU 84 records the multicast address in a response message and transmits it to the IP broadcasting terminal 30 (194). When it does not exist, the CPU 84 transfers a multicast address query message to the multicast group management apparatus for IP broadcasting 10 to inquire about the multicast address (193). As a result, the set-top box 80 receives a multicast address response message (195), and updates the content of the cache memory 86, based on it (196).

FIG. 20 shows an example of video distribution when a function to authenticate a video reception request message is added as a processing function of the set-top box 80, that is, the CPU 84. The set-top box 80 receives a video reception request message from the IP broadcasting terminal 30 (197). At this time, the set-top box 80 authenticates the request message, and based on the authentication result, transfers only relevant video packets to the IP broadcasting terminal 30.

As has been detailed above, according to the present invention, an IP broadcasting communication system can be provided which can reduce the load on users to set multicast addresses, and the load of setting multicasting to IP broadcasting terminals in a multicast network capable of multicast routing, and a multicast group management apparatus for IP broadcasting suitable for the system can be provided.

What is claimed is:

1. An IP broadcasting system that provides IP broadcasting services over an IP multicast network, the IP broadcasting system comprising:
    an IP broadcasting server that distributes video data by adding a multicast group identifier;
    an IP broadcasting terminal that transmits an IP broadcasting channel identifier;
    a multicast group management apparatus for IP broadcasting that allocates the multicast group identifier to the IP broadcasting channel identifier and includes a storing unit that holds correspondence information between the multicast group identifiers and the IP broadcasting channel identifiers; and
    a data transfer device disposed between the IP broadcasting terminal and the multicast network for transmitting a video distribution request message,
    wherein the IP broadcasting terminal includes a transmitting/receiving unit that transmits a query message including the requested IP broadcasting channel identifier to the multicast group management apparatus for IP broadcasting, receives a response message including the multicast group identifier corresponding to the IP broadcasting channel identifier included in the query message, the response message being transmitted from the multicast group management apparatus for IP broadcasting, and transmits a video reception request message by using the received multicast group identifier, and
    wherein the data transfer device includes a transmitting unit that receives the multicast group identifier corresponding to video data information, which is held by the data transfer device, from a multicast group management apparatus for IP broadcasting on the IP multicast network, that manages correspondence information between the multicast group identifier and the video data information, and transmits a video distribution request message including the received multicast group identifier to the IP multicast network, prior to receiving a video reception request message from the IP broadcasting terminal;
    a receiving unit that receives video data, to which the multicast group identifier included in the video distribution request message is assigned, transmitted from the IP multicast network based on the video distribution request message; and
    a transfer unit that, when receiving the video reception request message from the IF broadcasting terminal, transmits the receiving video data corresponding to the video reception request message to the IP broadcasting terminal.

2. The IP broadcasting system according to claim 1,
    wherein: the multicast group management apparatus for IP broadcasting holds a list of the multicast group identifiers in the storing unit; and
    based on a request to allocate the multicast group identifier from the IP broadcasting server, the multicast group management apparatus for IP broadcasting refers to the list to decide the multicast group identifier, and transmits it to the IP broadcasting server.

3. The IP broadcasting system according to claim 1, wherein the multicast group management apparatus for IP broadcasting holds a multicast address as the multicast group identifier.

4. The IP broadcasting system according to claim 1, wherein the multicast group management apparatus for IP broadcasting holds a combination of a multicast address and a source address as the multicast group identifier.

5. The IP broadcasting system according to claim 2, wherein: the list comprises a multicast address pool list; and the IP broadcasting system holds correspondence information between the multicast group identifiers and area information.

6. The IP broadcasting system according to claim 2, wherein: the list comprises a multicast address pool list; and the IP broadcasting system holds correspondence information between the multicast group identifiers and distribution priority within the IP multicast network.

7. A set-top box that connects an IP broadcasting terminal via an IP multicast network to an IP broadcasting server that distributes video data by adding a multicast address, the set-top box comprising:

a transmitting unit that receives the multicast address corresponding to video data information, which is held by the set-top box, from a multicast group management apparatus for IP broadcasting on the IP multicast network, that manages correspondence information between the multicast address and the video data information, and transmits a video distribution request message including the received multicast address to the IP multicast network, prior to receiving a video reception request message from the IP broadcasting terminal;

a receiving unit that receives video data, to which the multicast address included in the video distribution request message is assigned, transmitted from the IP multicast network based on the video distribution request message; and a transfer unit that, when receiving the video reception request message from the IP broadcasting terminal, transmits the received video data corresponding to the video reception request message to the IP broadcasting terminal.

8. The set-top box according to claim 7, further comprising:

a storing unit that holds correspondence information between an IP broadcasting channel identifier as the video data information and the multicast address.

9. The set-top box according to claim 8, wherein, on receiving a query message including the IP broadcasting channel identifier from the IP broadcasting terminal, the processing unit searches the correspondence information stored in the storing unit, and when the corresponding multicast address does not exist, inquires of the multicast group management apparatus for IP broadcasting.

* * * * *